US006850771B2

(12) United States Patent
Malladi et al.

(10) Patent No.: US 6,850,771 B2
(45) Date of Patent: Feb. 1, 2005

(54) UPLINK POWER CONTROL

(75) Inventors: Durga P. Malladi, San Diego, CA (US); Serge Willenegger, Onnens (CH); Tao Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 251 days.

(21) Appl. No.: 10/179,677

(22) Filed: Jun. 24, 2002

(65) Prior Publication Data

US 2004/0203985 A1 Oct. 14, 2004

(51) Int. Cl.[7] .............................. H04B 7/00; H04Q 7/20
(52) U.S. Cl. ...................... 455/522; 455/516; 455/437; 370/318; 370/320
(58) Field of Search ................................ 455/522, 516, 455/422.1, 442, 436, 437, 13.4; 370/318, 320, 331, 333, 335

(56) References Cited

U.S. PATENT DOCUMENTS

| 6,426,960 B2 | 7/2002 | Antonio | |
| 2002/0142791 A1 * | 10/2002 | Chen et al. | ................. 455/522 |
| 2003/0050084 A1 * | 3/2003 | Damnjanovic et al. | ..... 455/522 |
| 2003/0210668 A1 * | 11/2003 | Malladi et al. | ............ 370/335 |

FOREIGN PATENT DOCUMENTS

| EP | 1067706 A1 | 1/2001 |
| EP | 1164714 A1 | 12/2001 |
| EP | 1248388 A1 | 10/2002 |
| WO | WO 01/11800 A1 | 2/2001 |
| WO | WO 01/95521 A2 | 12/2001 |
| WO | WO 02/080400 A2 | 10/2002 |

OTHER PUBLICATIONS

Blaise et al, "Power control algorithms for soft handoff users in UMTS", Motorola Labs, CRM Paris. Jun. 27, 2002.*
NEC and Telecom Modus, "A method utilizing DL reference power to avoid power drifting", Sophia Antipolis, France, Sep. 20, 1999.*
Sony Corporation, "Reduction of DL channel quality feedback rate for HSDPA", Las Vegas, NV, Feb. 27, 2001.*

* cited by examiner

*Primary Examiner*—Nick Corsaro
*Assistant Examiner*—Edan Orgad
(74) *Attorney, Agent, or Firm*—Philip Wadsworth; Thien T. Nguyen; Donald C. Kordich

(57) ABSTRACT

Uplink power control is provided to maintain the integrity of the uplink HS-DPCCH when the UE goes into SHO. The target pilot SNR threshold is controlled by considering the pilot signal strength of the serving Node-B and/or the uplink channel condition of the serving Node-B when deciding to increase or decrease the target pilot SNR threshold of Nodes-B.

18 Claims, 1 Drawing Sheet

UPLINK POWER CONTROL

BACKGROUND OF THE INVENTION

1. Field of the Invention

The present invention relates generally to the field of wireless communication, and, more specifically, to uplink power control. Although the present invention is subject to a wide range of applications, it is especially suited for use in a cellular communication system, and will be described in that connection.

2. Description of the Related Art

Technical Specification 3GPP TS 25.211 v5.0.0 (2002-03), 3rd Generation Partnership Project (3GPP); Technical Specification Group Radio Access Network; Physical channels and mapping of transportation channels onto physical channels (FDD) (Release 5) provides for a High Speed Downlink Shared Channel (HS-DSCH). The HS-DSCH is a downlink transport channel shared by one or several user equipment (UE).

In 3GPP High Speed Data Packet Access (HSDPA), a UE can be in soft handoff (SHO) with multiple Node-Bs for the Dedicated Physical Channel (DPCH) on downlink. There is, however, no HSDPA SHO for the High Speed Downlink Shared Channel (HS-DSCH) and corresponding uplink High Speed Dedicated Physical Control Channel (HS-DPCCH). This may result in a condition called link imbalance. That is, the Node-B serving the high speed data over the HS-DSCH is different from the Node-B to which the UE has the best uplink for the DPCCH.

A need therefore exists for apparatus and methods for uplink power control during link imbalance that considers the reverse link HS-DPCH.

BRIEF DESCRIPTION OF THE DRAWINGS

Other features and advantages of the present invention will be set forth in part in the description which follows and accompanying drawings, wherein the preferred embodiments of the present invention are described and shown, and in part become apparent to those skilled in the art upon examination of the following detailed description taken in conjunction with the accompanying drawings, or may be learned by practice of the present invention. The advantages of the present invention may be realized and attained by means of the instrumentalities and combinations particularly pointed out in the appended claims.

DESCRIPTION OF THE PREFERRED EMBODIMENTS

Figure 1:
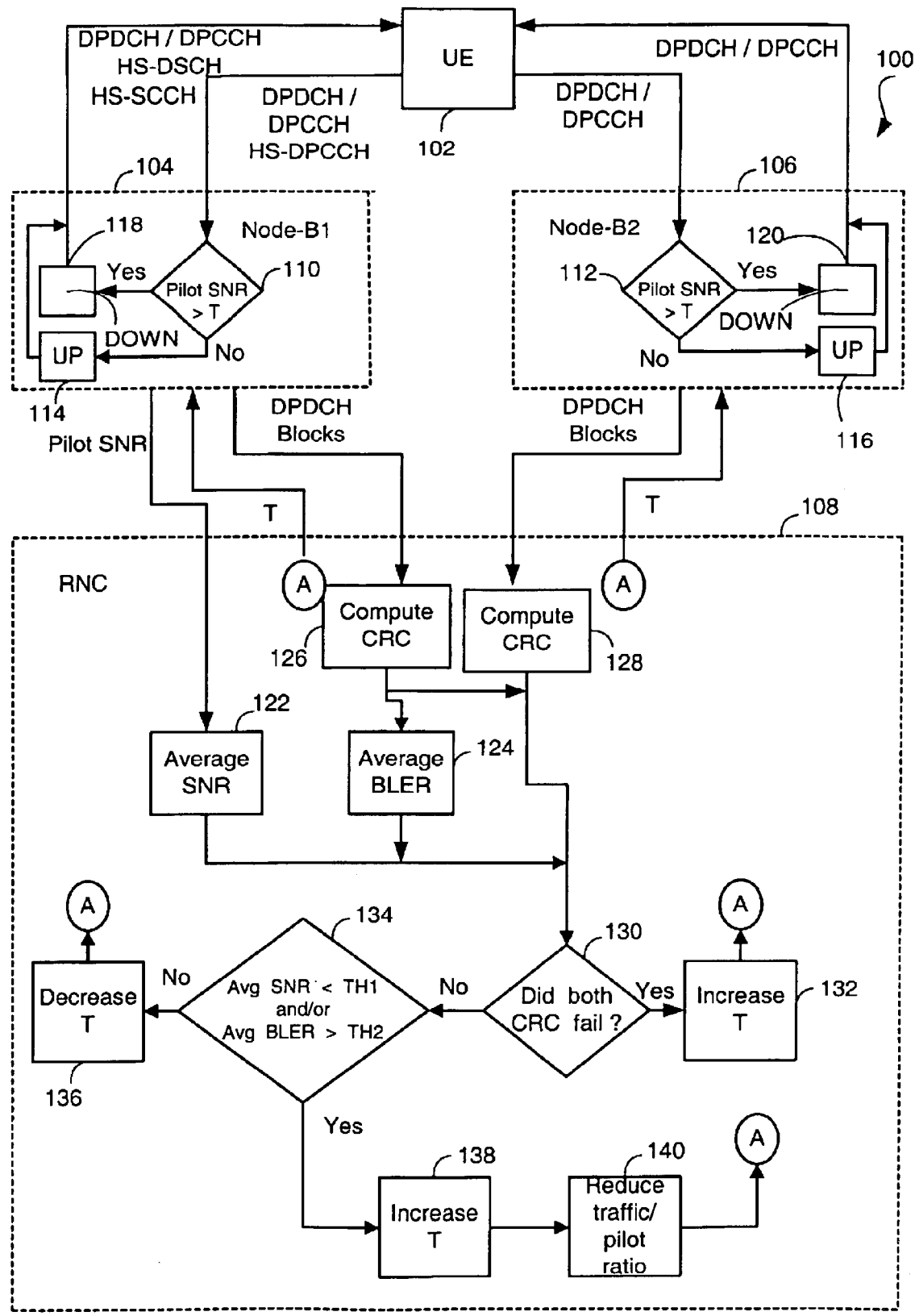
FIG. 1 is a generalized block diagram of a communication system configured according to the present invention.

FIG. 1 illustrates a generalized block diagram of a communication system 100. User equipment (UE) 102 can be in wireless communication with a Node-B1 104 and a Node-B2 106. The UE can be a device, such as, a cellular phone or other fixed or mobile wireless devices. A Node-B can be a device, such as, a cellular base station that serves an entire cell.

Node-B1 104 and Node-B2 106 can be in communication with Radio Network Controller (RNC) 108. The RNC receives signals from Node B-1 and Node-B2 and provides control information, among other things, to Node-B1 and Node-B2.

UE 102 can be in the coverage area of Node-B1 104 and Node-B2 106, and can communicate with Node-B1 and Node-B2 over various channels. For example, the Nodes-B can communicate signals to the UE over downlink channels, for example, downlink Dedicated Physical Channel (DPCH) denoted as Dedicated Physical Data Channel (DPDCH) and Dedicated Physical Control Channel (DPCCH) in FIG. 1, and High Speed Downlink Shared Channel (HS-DSCH). The UE can send signals to the Nodes-B over uplink channels, such as, uplink DPDCH, uplink DPCCH, and High Speed Dedicated Physical Control Channel (HS-DPCCH) associated with downlink HS-DSCH.

UE 102 can send an omnidirectional pilot signal comprising blocks of data over uplink DPCCH, in addition to feedback information bits (FBI) and UP/DOWN request signals for the downlink power control.

The UE's pilot signal can be received by Nodes-B within range of the pilot signal. Each Node-B has a target pilot signal-to-noise (SNR) threshold T at which it desires to receive the pilot signal from the UE. Each Node-B receiving the pilot signal can calculate the SNR of the received pilot signal. (Blocks 110 and 112.) If the calculated SNR is below the threshold T, a Node-B can request the UE to increase the transmit power of the pilot signal by sending an UP request over DPCCH. (Blocks 114 and 116.) If the calculated SNR is above the threshold T, a Node-B can request the UE to decrease the transmit power of the pilot signal by sending a DOWN request over DPCCH. (Blocks 118 and 120.)

An OR of DOWNs determines whether to increase or decrease the pilot signal strength. If the UE receives a DOWN request from any one of the Nodes-B, then the UE's pilot strength is decreased. If the UE receives UP requests from all of the Nodes-B, then the UE's pilot strength is increased.

A link imbalance may occur when UE 102 is receiving high speed data from Node-B1 over channel HS-DSCH and is in an uplink SHO state with Node-B1 and Node-B2. This link imbalance condition can occur when Node-B2 is sending a DOWN request and Node-B1 is sending an UP request. In addition, the UE can vary its transmit power according to the conventional OR of DOWNs when in SHO state.

The reduction of pilot signal transmit power by UE 102 can affect the uplink high speed communications between the UE and Node-B1 104 because the signal strength of HS-DPCCH will be reduced in proportion to the reduction of the pilot signal strength in accordance with a traffic-to-pilot ratio stored in the UE.

In HSDPA, Node-B1 104 can send packet data to UE 102 over HS-DSCH. The UE can only receive packet data from one Node-B at a time over HS-DSCH. In FIG. 1, Node-B1 104 is the Node transmitting packet date to UE. Cell switching can occur that switches the UE from receiving packet data from Node-B1 to receiving packet data from Node-B2 106 over the downlink channel HS-DSCH associated with Node-B2 (not shown). Higher level signaling achieves cell switching. Link imbalance, however, can exist over a shorter time scale than that of cell switching.

UE 102 can send an acknowledge/not-acknowledge (ACK/NAK) signal over HS-DPCCH. An ACK is sent by the UE if the UE has successfully received the packet data from the serving Node-B1 over HS-DSCH. Conversely, a NAK is sent by the UE if the UE has unsuccessfully received the packet data from the serving Node-B1 over HS-DSCH. If a NAK is received by the sending Node-B1, the sending Node-B1 can re-transmit the previously sent packet data. The UE can send nothing (NULL) if it missed a High Speed Shared Control Channel (HS-SCCH) associated with HS-DSCH. HS-SCCH indicates to the UE that a future transmission is imminent on HS-DSCH.

In a link imbalance condition, Node-B2 transmits a DOWN request. This causes UE 102 to decrease its pilot signal strength, and, correspondingly, the signal strength of ACK/NAK. The decreased strength of the ACK/NAK signal can result in ACKs being received as NAKs that lead to increased transmissions on HS-DSCH; and NAKs or NULLs being received as ACKs that lead to missed packets on HS-DSCH.

Further, because the UE sends channel quality indication (CQI) over HS-DPCCH, Node-B1 may receive false indications.

A solution to this problem is for the RNC 108 to monitor the pilot strength, for example, the average SNR of the pilot signal received by Node-B1 104 (block 122) and the average block error rate (BLER) of the serving Node-B1 (block 124). These parameters may be used in determining whether to increase or decrease the target pilot SNR threshold T.

The RNC 108 can compute the cyclic redundancy check of blocks transmitted over uplink DPDCH for both Nodes-B (blocks 126 and 128). If the CRC fails for both channels (block 130), the RNC directs the Nodes-B to increase the target pilot SNR threshold T (block 132). This in turn makes it likely that Node-B2 will change its request from a DOWN to an UP.

If the CRC does not fail for both channels (block 130), RNC 108 determines if the uplink channel condition between Node-B1 104 transmitting the high speed packet data and the UE 102 is unsatisfactory (block 134), for example, determining if the average pilot signal SNR is less than a predetermined threshold TH1, or determining if the block error rate (BLER) over DPDCH is greater than a predetermined threshold TH2, or both. If the uplink channel condition is satisfactory, then RNC 108 can request that the target pilot SNR threshold T of the Nodes-B be decreased. (Block 136.)

If the uplink channel condition between Node-B1 104 transmitting the high speed packet data and the UE 102 is unsatisfactory (block 134), the RNC 108 can request that the target pilot SNR threshold T be increased (block 138). The increased T makes it more likely that Node-B2 will change its DOWN request to an UP request, which in turn can prevent a decrease in the pilot strength of the UE according to the OR of DOWNs.

Optionally, the RNC can request the the traffic-to-pilot ratio of the Nodes-B be reduced (block 140) in addition to increasing T (block 138). Reducing the traffic-to-pilot ratio reduces the average return link interferences by reducing the traffic channel strength in relation to the pilot signal strength.

The present invention is capable of other and different embodiments, and its several details are capable of modification. For example, although the invention is described with reference to the aforementioned technical specification for Wideband Code Division Multiple Access (W-CDMA), the invention can equivalently be applied to CDMA2000 1xEV-DV. For example, the following 3GPP terms have correspondence to CDMA2000 terms: UE corresponds to a Mobile Station (MS); a Node-B corresponds to a Base Terminal Station (BTS); RNC corresponds to a Base Station Controller (BSC); HS-DSCH corresponds to Forward Packet Data Channel (F-PDCH); DPCH corresponds to Fundicated Channel (FCH/DCCH); HS-DPCCH corresponds to R-CQICH and R-ACKCH; and BLER corresponds to frame error rate (FER).

Node-B can be a device a cellular base station having beam-forming antennas that that serves various sectors of a cell. In this case, the functions of the RNC can be performed in the base station serving the UE for a link imbalance between sectors of the same base station.

The functionality described herein, and of the blocks shown in FIG. 1, may be carried out in dedicated hardware, or equivalently, in software and a processor.

In conclusion, the uplink power control described herein provides the advantage to maintain the integrity of the uplink HS-DPCCH when the UE goes into SHO. This is primarily accomplished by controlling the target pilot SNR threshold by considering the pilot signal strength of the serving Node-B1 and/or the uplink channel condition the serving Node-B1 when deciding to increase or decrease the target pilot SNR threshold of Nodes-B.

Those skilled in the art will recognize that other modifications and variations can be made in the uplink power control technique of the present invention and in construction and operation without departing from the scope or spirit of this invention.

What is claimed is:

1. An apparatus for uplink power control, comprising:
   determination logic for determining a channel condition of an uplink channel; and
   a target pilot signal-to-noise (SNR) threshold setter for increasing a target pilot SNR threshold when the determined channel condition is unsatisfactory, wherein the determined channel condition is unsatisfactory when the average SNR of a pilot signal is less than a predetermined first threshold and an average block error rate over the uplink channel is greater than a predetermined second threshold.

2. The apparatus of claim 1, further comprising a traffic-to-pilot ratio setter for reducing the traffic-to-pilot ratio when the target pilot SNR threshold is increased.

3. The apparatus of claim 1, wherein the target pilot signal-to-noise (SNR) threshold setter decreases the target pilot SNR threshold when the determined channel condition is satisfactory.

4. The apparatus of claim 1, wherein the determined channel condition is unsatisfactory when the average SNR of a pilot signal is less than a predetermined first threshold.

5. The apparatus of claim 1, wherein the determined channel condition is unsatisfactory when the average block error rate over an uplink data channel is greater than a predetermined second threshold.

6. An apparatus for uplink power control comprising:
   a signal-to-noise (SNR) averager for computing the average SNR or an uplink pilot signal;
   a block-error-rate (BLER) averager for computing the average BLER or an uplink data signal;
   determination logic for determining the channel condition of an uplink channel is satisfactory or unsatisfactory according to the average SNR or average BLER or both; and
   a target pilot signal-to-noise (SNR) threshold setter for increasing a target pilot SNR threshold when the determined channel condition is unsatisfactory and for decreasing the target pilot SNR threshold when the determined channel condition is satisfactory.

7. A method for uplink power control, comprising:
   determining a channel condition of an uplink channel; and
   increasing a target pilot SNR threshold when the determined channel condition is unsatisfactory, wherein the determined channel condition is unsatisfactory when the average SNR of a pilot signal is less than a predetermined first threshold and an average block error rate over the uplink channel is greater than a predetermined second threshold.

8. The method of claim 7 further comprising reducing a traffic-to-pilot ratio when the target pilot SNR threshold is increased.

9. The method of claim 7 further comprising decreasing the target pilot SNR threshold when the determined channel condition is satisfactory.

10. The method of claim 7 wherein the determined channel condition is unsatisfactory when the average SNR of a pilot signal is less than a predetermined first threshold.

11. The method of claim 7 wherein the determined channel condition is unsatisfactory when the average block error rate over an uplink data channel is greater than a predetermined second threshold.

12. A method for uplink power control comprising:
computing the average SNR or an uplink pilot signal;
computing the average BLER or an uplink data signal;
determining whether the channel condition of an uplink channel is satisfactory or unsatisfactory according to the average SNR or average BLER or both; and
increasing a target pilot SNR threshold when the determined channel condition is unsatisfactory and for decreasing the target pilot SNR threshold when the determined channel condition is satisfactory.

13. An apparatus for uplink power control comprising:
means for determining a channel condition of an uplink channel; and
means for increasing a target pilot SNR threshold when the determined channel condition is unsatisfactory, wherein the determined channel condition is unsatisfactory when the average SNR of a pilot signal is less than a predetermined first threshold and an average block error rate over the uplink channel is greater than a predetermined second threshold.

14. The apparatus of claim 13 further comprising reducing a traffic-to-pilot ratio when the target pilot SNR threshold is increased.

15. The apparatus of claim 13 further comprising decreasing the target pilot SNR threshold when the determined channel condition is satisfactory.

16. The apparatus of claim 13 wherein the determined channel condition is unsatisfactory when the average SNR of a pilot signal is less than a predetermined first threshold.

17. The apparatus of claim 13 wherein the determined channel condition is unsatisfactory when the average block error rate over an uplink data channel is greater than a predetermined second threshold.

18. An apparatus for uplink power control comprising:
means for computing the average SNR or an uplink pilot signal;
means for computing the average BLER or an uplink data signal;
means for determining whether the channel condition of an uplink channel is satisfactory or unsatisfactory according to the average SNR or average BLER or both; and
means for increasing a target pilot SNR threshold when the determined channel condition is unsatisfactory and for decreasing the target pilot SNR threshold when the determined channel condition is satisfactory.

* * * * *